Nov. 2, 1943.     K. W. COUSE     2,333,469
COMBINED ELECTRICAL AND MECHANICAL POWER STRUCTURE
Filed Aug. 15, 1942     3 Sheets-Sheet 3
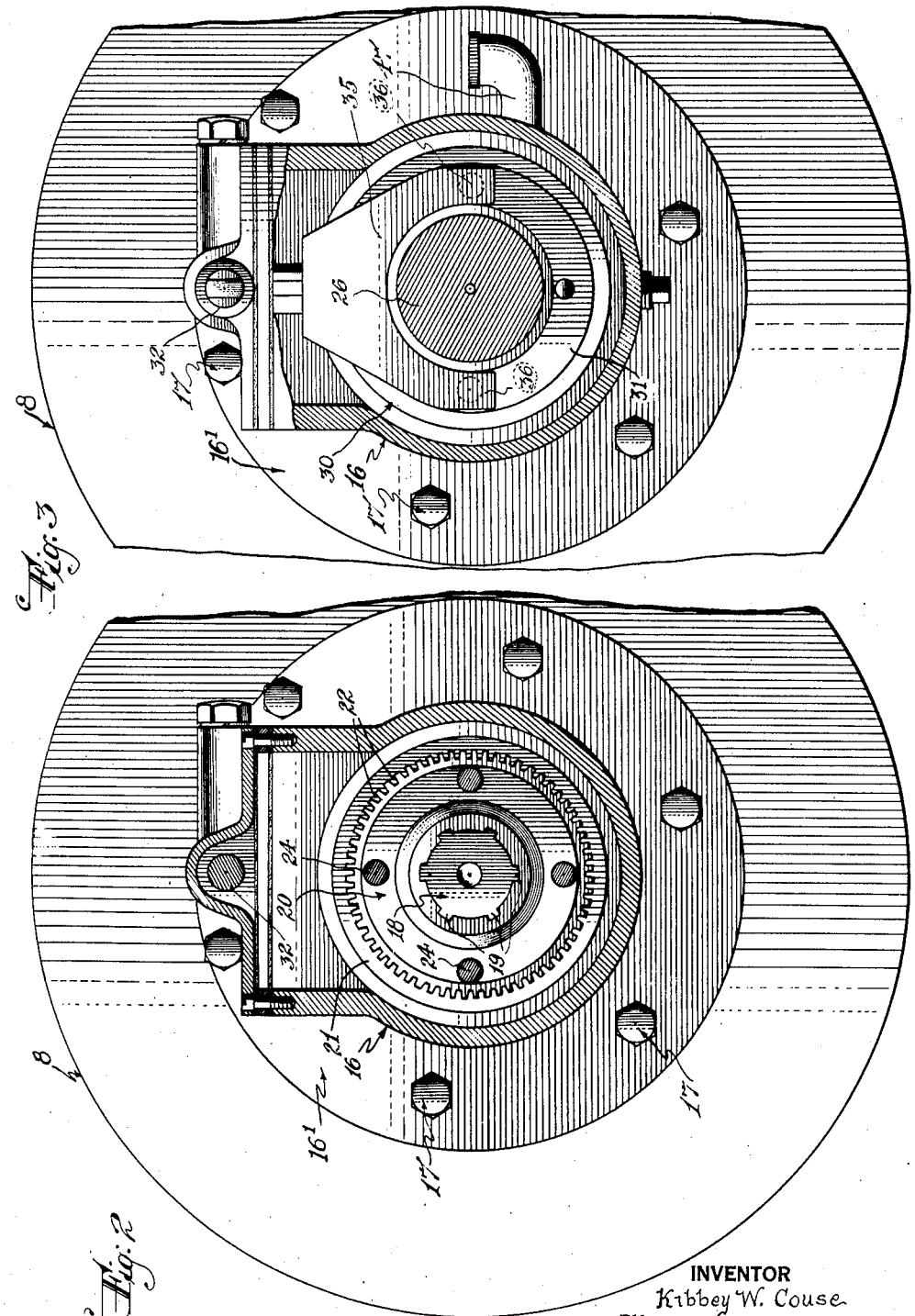
INVENTOR
*Kibbey W. Couse*
BY
*A. D. T. Libby*
ATTORNEY Patented Nov. 2, 1943

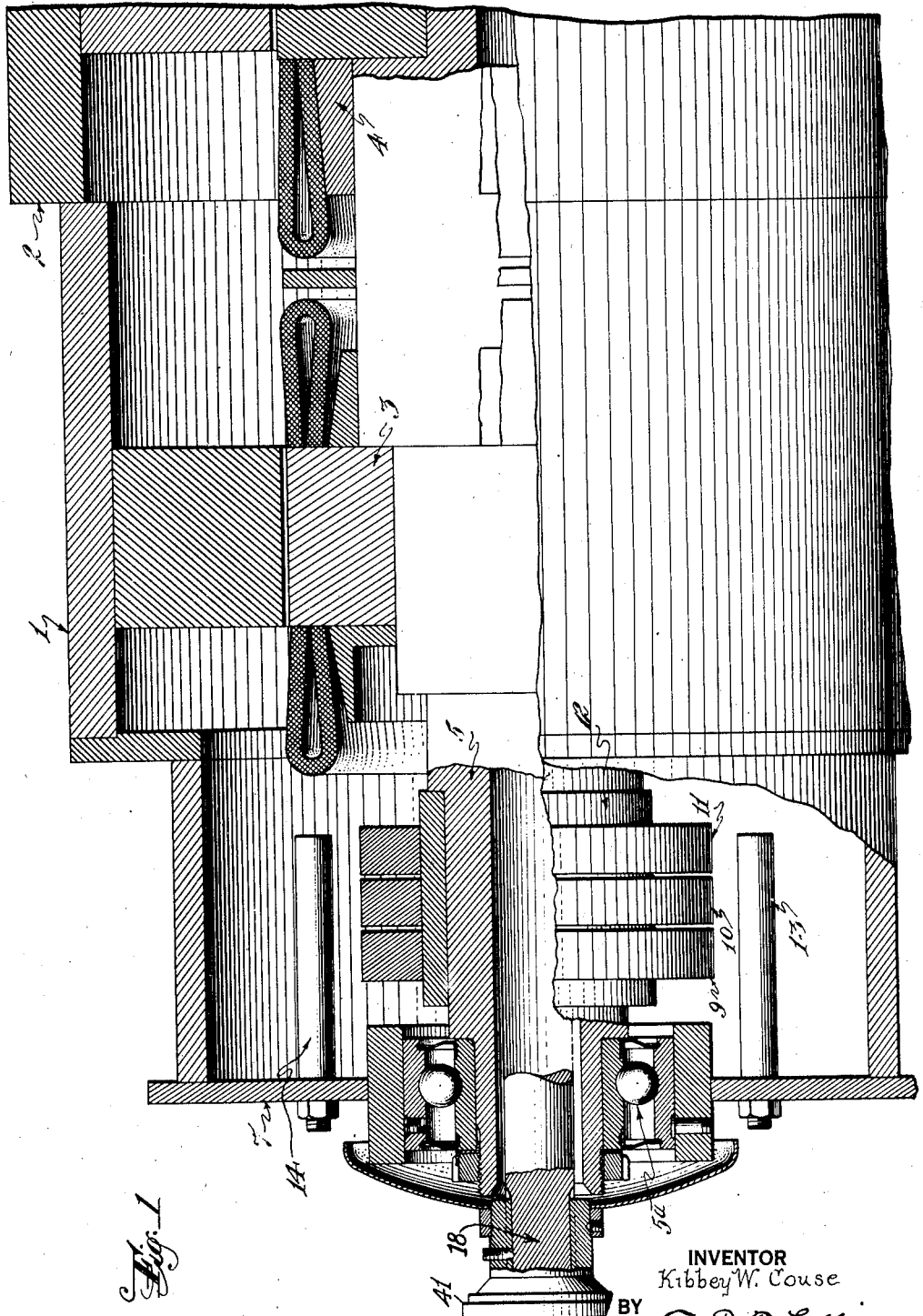

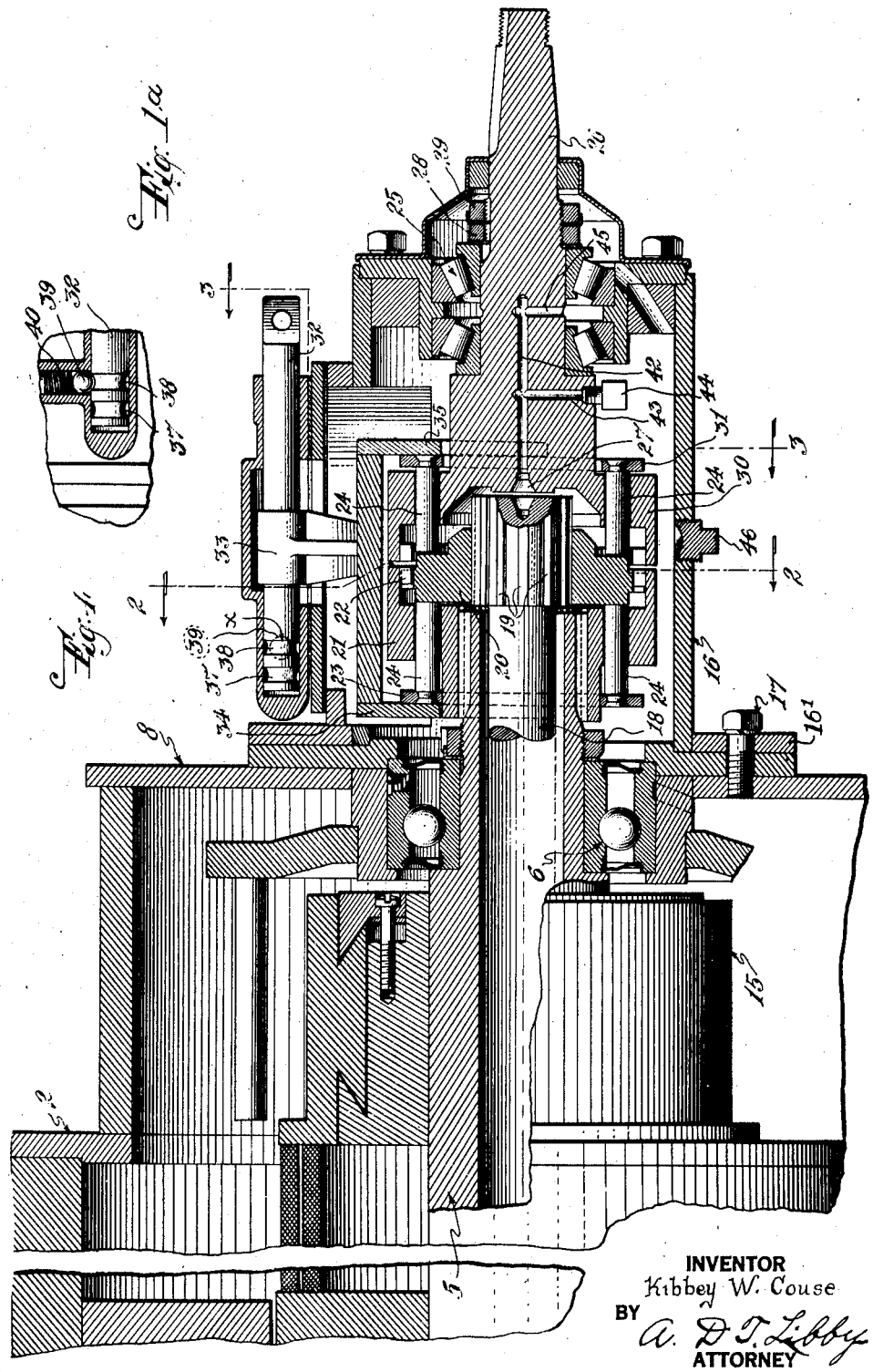

2,333,469

UNITED STATES PATENT OFFICE 2,333,469

COMBINED ELECTRICAL AND MECHANICAL POWER STRUCTURE

Kibbey Whitman Couse, Newark, N. J.

Application August 15, 1942, Serial No. 454,910

13 Claims. (Cl. 180—53)

This invention relates to a combined electrical and mechanical power structure wherein a dynamo-electric structure is combined with a special type of power transmission or power take-off to form a complete combination structure which has certain adaptations, only one of which will be specifically described to show the method of application.

It is the principal object of my invention to provide a combination power structure which may be operated electrically or mechanically for different purposes.

Another object of my invention is to provide a combined electrical and mechanical power structure which, from the electrical standpoint, is highly efficient when used for the purposes intended, as will be pointed out.

Another object of my invention is to provide a power structure which is highly useful in connection with army or other types of repair trucks.

Other objects will appear to those familiar with structures of the types described herein, on a reading of the following specification taken in connection with the annexed drawings, wherein:

Figure 1 is a part-sectional and part-elevational view of one end of the power structure.

Figure 1a is a view of the other or right-hand portion of the structure shown in Figure 1.

Figure 2 is a section on the line 2—2 of Figure 1a.

Figure 3 is a section on the line 3—3 of Figure 1a.

Figure 4 is a fragmentary section showing certain details at the point X of Figure 1a.

In the various views, wherein like numbers refer to corresponding parts, the electrical portion of the power structure comprises a dynamo-electric machine which is composed of a motor 1 and a generator 2. The armature or rotor 3 of the motor 1, and the rotor or armature 4 of the generator 2, are both mounted on a common hollow shaft 5 which is supported in suitable bearings 5a and 6 carried by their respective end plates 7 and 8. For the motor 1 I prefer to use a three-phase motor of the synchronous type. Three slip-rings 9, 10 and 11, carried by an insulator 12, are shown for conveying current to the interior portions of the motor. In the sectional view shown in Figure 1, only two of the brush holder studs 13 and 14 are shown without the brush holders and brushes which convey current to the slip-rings 9, 10 and 11. The generator is of the D. C. type and has a commutator 15 which is shown in Figure 1a, partly in section and partly in elevation, the brushes not being shown.

Since the detail construction of the motor and generator forms no part of the present invention, they need not be further described except to say that in the particular outfit which I have installed on army trucks, the generator is for delivering welding current of approximately forty volts, the ampere capacity being whatever is desired for the size truck, etc. The purpose of using a synchronous motor in place of an induction motor will be later pointed out.

On one end of the dynamotor structure such as at the generator end, a casing 16 having a flange 16' is fastened as by a plurality of bolts or studs 17. Positioned within the hollow shaft 5, is a drive shaft 18 that extends through the hollow shaft at both ends; in fact, both ends of the hollow shaft and the drive shaft 18 project at one end within the casing 16. The extremity of the drive shaft 18 is supplied with a plurality of splines 19 on which is slidably mounted a coupling 20, but which is non-rotatably positioned on the shaft 18 by means of the splines 19. The coupling 20 has around its outer periphery, gearlike teeth or splines. Preferably, the splines may have a slight curvature to promote easy engagement between the slidable coupling 20 and its cooperating parts which also will give a certain amount of flexibility.

This end of the hollow shaft 5 carries a coupling 21 having teeth or splines 22 which may be similar in form to the teeth or splines on the coupling 20, to mesh with the cooperating teeth or splines on the slidable coupling 20. Positioned over the end of the hollow shaft 5 and over the hub on the coupling 21, is a ring 23 carrying a plurality of studs 24, four being used, and these project through the coupling 21 so as to engage one side of the slidable coupling 20.

The casing 16 carries a bearing 25 that in turn supports a shaft 26 which may be termed an output shaft. The shaft 26 is in axial alignment with the hollow shaft 5 and the drive shaft 18. Any wear on the bearing 25 can be taken up by means of the adjusting nut 28 and lock nut 29.

The inner end of the shaft 26 carries a toothed coupling 30 similar to and adjacent the coupling 21. The teeth or splines on the coupling 30 may also be made like the teeth or splines on the slidable coupling 20, which will add further to the flexibility and ease of engagement of the slidable coupling with not only the coupling 30, but also, as has been explained, with the coupling 21. While I prefer to use a curved surface on the teeth or splines of the couplings 21 and 30, this is not altogether necessary.

A ring 31, like the ring 23 is provided and carries the same type of pins 24 as carried by the ring 23, and these pins pass through the coupling 30 into cooperative relation with the opposite side of the coupling 20. The casing 16 supports, through suitable mounting members, a coupling-shift rod 32 that is operated by a lever in the cab of the truck. The rod 32 carries a member 33 which in turn has oppositely disposed forks 34 and 35 for engagement with the rings 23 and 31. If desired, the forks 34 and 35 may have fastened thereto pads 36 of hard or wear-resisting material, or the rings themselves may be constructed of wear-resisting material. The end of the rod 32 is provided with annular recesses 37 and 38 within which a ball 39 is positioned, the ball being pressed into one or the other of these grooves by a spring 40. This is for the purpose of self-aligning the operating rod 32 and positioning the forks 34 and 35 so that they will slide out of engagement with the rings 23 and 31 after a coupling shift has been made as will be presently described.

When this power structure is installed on a truck, the shaft 26 is adapted to be connected to the differential of the rear portion of the truck, while the other end of the drive shaft 18 is provided with a means such as a flange 41 for connection with a universal joint attached to the hand brake drum, or to a shaft going to the truck transmission, whereby the drive shaft 18 and its coupling member 20 may be held in neutral position by the transmission.

Coming now to the operation of this power structure, if the truck is to be driven by the truck engine, the shift rod 32 is operated so as to shift the slidable coupling 20 into mesh with the coupling 30. This will connect the drive shaft 18 directly to the shaft 26 and through to the differential or driving wheels of the truck. When the truck is stationary and it is desired to use current from the generator, such as for welding purposes, the truck transmission is moved from neutral and the shift lever 32 is moved to pass the coupling 20 into mesh with the coupling 21, that is fastened to the hollow shaft 5. This allows the truck engine to operate both rotors of the motor and generator and cause both units to deliver current.

I prefer to use a motor of the synchronous type, instead of the induction type as usually supplied with a motor generator set, as the synchronous motor will retain its synchronous speed and will not slip under the load which it is designed to carry, as is usual with induction motors. This means that when the generator is an arc welder, it will hold its voltage better and thereby maintain a steadier arc up to a point of overload, when the synchronous motor will be forced out of phase and stop. Furthermore, by using a synchronous motor, when it and the machine that is always a generator, are driven from the engine of the truck, as has been explained, the motor will act as a generator and will deliver power which may be used for lighting the truck or operating certain machine tools carried by the truck such as shown in my Design Patent D-109,942, issued May 31, 1938.

If the truck is at some place where power is available, this power may be applied to the motor part of the dynamoelectric apparatus and drive the generator for delivering its power. In this case the coupling 20 is shifted out of mesh with the coupling 21 and into mesh with the coupling 30, but since the engine is not running, no driving power will be carried to the shaft 26.

In passing, it may be mentioned that the shaft 26 has an oil passage 42 therein with a passage 43 carrying a scoop 44 for scooping up oil from the lower part of the casing 16 and conveying it to the bearing 25 by way of the passage 45 and to the end 27 of the shaft 26, which may be essential if, for any reason, the two shafts should come into end contact when only the shaft 18 is turning. An oil drain plug 46 in the bottom of the casing 16 is used for draining out the old oil, and the casing can be filled through the filler plug 47.

It is obvious that many of the details may be varied without departing from the spirit of my invention or the scope of the appended claims.

What I claim is:

1. A power structure including an electric motor and an electric generator, the rotary portions of each being carried on a common hollow shaft, a drive shaft carried within the hollow shaft and protruding from both ends thereof, with means at one end for attaching a power transmitting means thereto, and a slidable coupling member carried on the opposite end of the shaft and having teeth or splines, a splined coupling operatively connected to the end of the hollow shaft and positioned adjacent the slidable coupling, a shaft mounted in alignment with the first two shafts and carrying a splined coupling adjacent the coupling on the hollow shaft, and means for moving the slidable coupling into mesh with either of said adjacently located couplings according to the desired manner of using the power structure.

2. A power structure including an electric motor and an electric generator, the rotary portions of each being carried on a common hollow shaft, a drive shaft carried within the hollow shaft and protruding from both ends thereof, with means at one end for attaching a power transmitting means thereto, a casing fastened to one end of the motor generator part of the structure and into which both of said shafts extend, a coupling fixed on the end of the hollow shaft within the casing and having engagement teeth or splines, a coupling slidably but non-rotatably mounted on the drive shaft to revolve therewith and having teeth or splines positioned so as to engage the coupling on the hollow shaft, an output shaft extending from the casing and drivingly carrying a coupling within the casing, the coupling being positioned and having teeth or splines so as to be engaged by the slidable coupling, means positioned within the casing for engaging the slidable coupling to move it into mesh with either of said other two mentioned couplings at will, and means associated with the casing for moving said slidable coupling-engaging means.

3. A power structure including two dynamo-electric machines having a hollow common shaft for their rotary portions carried in end housing members, a drive shaft positioned within the hollow shaft and having extending ends and a coupling slidably carried on one end of the drive shaft and having teeth or splines, a coupling operatively connected to one end of the hollow shaft and having teeth or splines in a position to be engaged by said driving coupling, a further shaft mounted in suitable support means and operatively carrying a coupling with teeth or splines in a position to be engaged by said driving coupling, and means for shifting said driving coupling into mesh with either of said other two mentioned couplings.

4. A power structure including two dynamo-electric machines having a hollow common shaft for their rotary portions carried in end housing members, a drive shaft positioned within the hollow shaft and having extending ends and a coupling slidably carried on one end of the drive shaft and having teeth or splines around its outer periphery, a coupling operatively connected to one end of the hollow shaft and having teeth or splines in a position to be engaged by said driving gear, a further shaft mounted in suitable support means in tandem relation to said drive shaft, a coupling means carried on said further shaft and having teeth or splines in a position to be engaged by said driving coupling, and means for shifting said driving coupling into mesh with either of said other two mentioned couplings.

5. A power structure as set forth in claim 3, further defined in that the dynamo-electric machines comprise a generator and a motor whereby the generator may be operated from the motor when a source of power for the motor is available.

6. A power structure as set forth in claim 3, further defined in that the dynamo-electric machines comprise a generator which acts as such at all times when operated, while the other machine may act as a motor to drive the generator, or as a generator, when said drive shaft with its coupling, is coupled to said hollow shaft and power is applied to the drive shaft.

7. A power structure as set forth in claim 3, further defined in that the dynamo-electric machines comprise a generator which acts as such at all times when operated, while the other machine is a synchronous motor which will drive the generator when a suitable source of current is applied to the motor, or the motor may also function as a generator when power is applied to said drive shaft and its sliding coupling is connected to the coupling on the hollow shaft.

8. A power structure including two dynamo-electric machines having a hollow common shaft for their rotary portions carried in end housing members, a drive shaft positioned within the hollow shaft and having extending ends and a coupling slidably carried on one end of the drive shaft and having engaging teeth or splines, a casing attached to one end of the dynamo-electric machines, the hollow shaft and the drive shaft with its sliding coupling extending into the casing, a bearing carried by the free end of the casing, a shaft carried by said bearing and having one end extending without the casing for attachment to a part to be operated, while the other end of this shaft terminates adjacent the said drive shaft and carries a coupling having teeth or splines in a position to be engaged by said slidable coupling, a coupling on the end of the hollow shaft and having teeth or splines positioned to be engaged by the slidable coupling, and means associated with the casing for shifting the slidable coupling into mesh with either of the other two couplings.

9. A power structure as set forth in claim 8, further defined in that said means for shifting the slidable coupling includes a pair of rings, one positioned over the end of the hollow shaft and adjacent the coupling carried by the hollow shaft and having a plurality of arcuately spaced pins for engaging one side of the slidable coupling, the other ring being positioned over the shaft carried by said casing and adjacent the coupling carried by this shaft and having a plurality of arcuately spaced pins for engaging the side of said slidable coupling opposite to the side engaged by the first-mentioned pins, the said rings being engaged by shifting means operable from outside the casing.

10. A power structure as set forth in claim 8, further defined in that said means for shifting the slidable coupling includes a pair of rings, one positioned over the end of the hollow shaft and adjacent the coupling carried by the hollow shaft and having a plurality of arcuately spaced pins for engaging one side of the slidable coupling, the other ring being positioned over the shaft carried by said casing and adjacent the coupling carried by this shaft and having a plurality of arcuately spaced pins for engaging the side of said slidable coupling opposite to the side engaged by the first-mentioned pins, while the means associated with the casing for shifting the slidable coupling includes a forked member which contacts with engagement parts on said rings at least at the time of shifting.

11. A power structure for an automotive vehicle driven by an engine including, a welding generator and a motor, the armature of the generator and the rotor of the motor being carried by a hollow shaft, a drive shaft positioned within the hollow shaft but extending therefrom at both ends, one end being adapted to be connected to the output side of the vehicle transmission while the other end carries a slidable coupling thereon for rotation therewith and having teeth or splines, a casing fastened to the generator, a coupling on the end of the hollow shaft positioned within the casing and having teeth or splines to be engaged by said slidable coupling, an output shaft for connection to the differential of the vehicle carried by the casing and also having a toothed coupling positioned to be engaged by said slidable coupling, said output shaft being in alignment with the drive shaft, and means for shifting said slidable coupling into mesh with either of the other two couplings whereby the vehicle engine may drive the vehicle, or drive both the welding generator and the motor as a generator, or allow the motor alone to drive the generator.

12. A power structure as set forth in claim 8, further defined in that said means for shifting the slidable coupling includes a pair of rings, one positioned over the end of the hollow shaft and adjacent the coupling carried by the hollow shaft and having a plurality of arcuately spaced pins for engaging one side of the slidable coupling, the other ring being positioned over the shaft carried by said casing and adjacent the coupling carried by this shaft and having a plurality of arcuately spaced pins for engaging the side of said slidable coupling opposite to the side engaged by the first-mentioned pins, while the means associated with the casing for shifting the slidable coupling includes a forked member having wear-resisting pads for engaging said rings, and a self-aligning device to hold the forked member in a position whereby there will be a slight clearance between said pads and the rings after completing a shift of the slidable coupling as described.

13. A power structure including two dynamo-electric machines having a hollow common shaft for their rotary portions carried in end bearing supports, a drive shaft positioned within the hollow shaft and having extending ends with a coupling slidably but non-rotatably carried on one end of the drive shaft and having engaging means thereon, a coupling operatively connected to one end of the hollow shaft and having engagement means in a position to be engaged by said engaging means on said driving coupling, a further shaft mounted in suitable support means and operatively carrying a coupling having engagement means in a position to be engaged by said engaging means on said driving coupling, and means for shifting said driving coupling into operative engagement with either of said two mentioned couplings.

KIBBEY WHITMAN COUSE.